United States Patent

(12) United States Patent
Huang

(10) Patent No.: US 9,253,776 B2
(45) Date of Patent: Feb. 2, 2016

(54) ADAPTIVE TRANSITION OF USER EQUIPMENT

(71) Applicant: Empire Technology Development LLC, Wilmington, DE (US)

(72) Inventor: Anpeng Huang, Beijing (CN)

(73) Assignee: Empire Technology Development LLC, Wilmington, DE (US)

( * ) Notice: Subject to any disclaimer, the term of this patent is extended or adjusted under 35 U.S.C. 154(b) by 0 days.

(21) Appl. No.: 14/358,990

(22) PCT Filed: Jun. 7, 2013

(86) PCT No.: PCT/CN2013/076900
§ 371 (c)(1),
(2) Date: May 16, 2014

(87) PCT Pub. No.: WO2014/194509
PCT Pub. Date: Dec. 11, 2014

(65) Prior Publication Data
US 2015/0237622 A1   Aug. 20, 2015

(51) Int. Cl.
H04W 72/04 (2009.01)
H04W 76/04 (2009.01)
H04W 76/06 (2009.01)

(52) U.S. Cl.
CPC ........ *H04W 72/0446* (2013.01); *H04W 76/045* (2013.01); *H04W 76/068* (2013.01)

(58) Field of Classification Search
USPC .............................................. 455/452.1, 450
See application file for complete search history.

(56) References Cited

U.S. PATENT DOCUMENTS

| 7,773,991 | B2 | 8/2010 | Osterling et al. |
| 8,117,477 | B2 | 2/2012 | Kim et al. |
| 2008/0080423 | A1 | 4/2008 | Kolding et al. |
| 2010/0061331 | A1 | 3/2010 | Guo et al. |
| 2011/0007643 | A1 | 1/2011 | Liang et al. |
| 2011/0053566 | A1* | 3/2011 | Nader .................. 455/414.1 |
| 2015/0156761 | A1* | 6/2015 | Christoffersson ............ 455/450 |

FOREIGN PATENT DOCUMENTS

| CN | 101459974 A | 6/2009 |
| CN | 102026344 A | 4/2011 |
| EP | 1760894 A2 | 3/2007 |

OTHER PUBLICATIONS

Morales-Jim'Enez, D., et al., "Impact of Feedback Channel Delay on Adaptive OFDMA Systems," pp. 10.

Tesanovic, M., "Reducing the signalling overhead for wireless VoIP transmission using weighted prioritisation," Proceedings of the 6th international conference on Symposium on Wireless Communication Systems, pp. 580-584 (2009).

International Search Report with Written Opinion for International Application No. PCT/CN2013/076900 mailed on Mar. 20, 2014.

* cited by examiner

Primary Examiner — Kabir A Timory
(74) Attorney, Agent, or Firm — Brundidge & Stanger, P.C.

(57) ABSTRACT

In a wireless communication system, a base station application hosted on a base station may be configured to change, or switch, a wireless communication device located in the range of a respective cell between an idle state and a connected state.

24 Claims, 4 Drawing Sheets

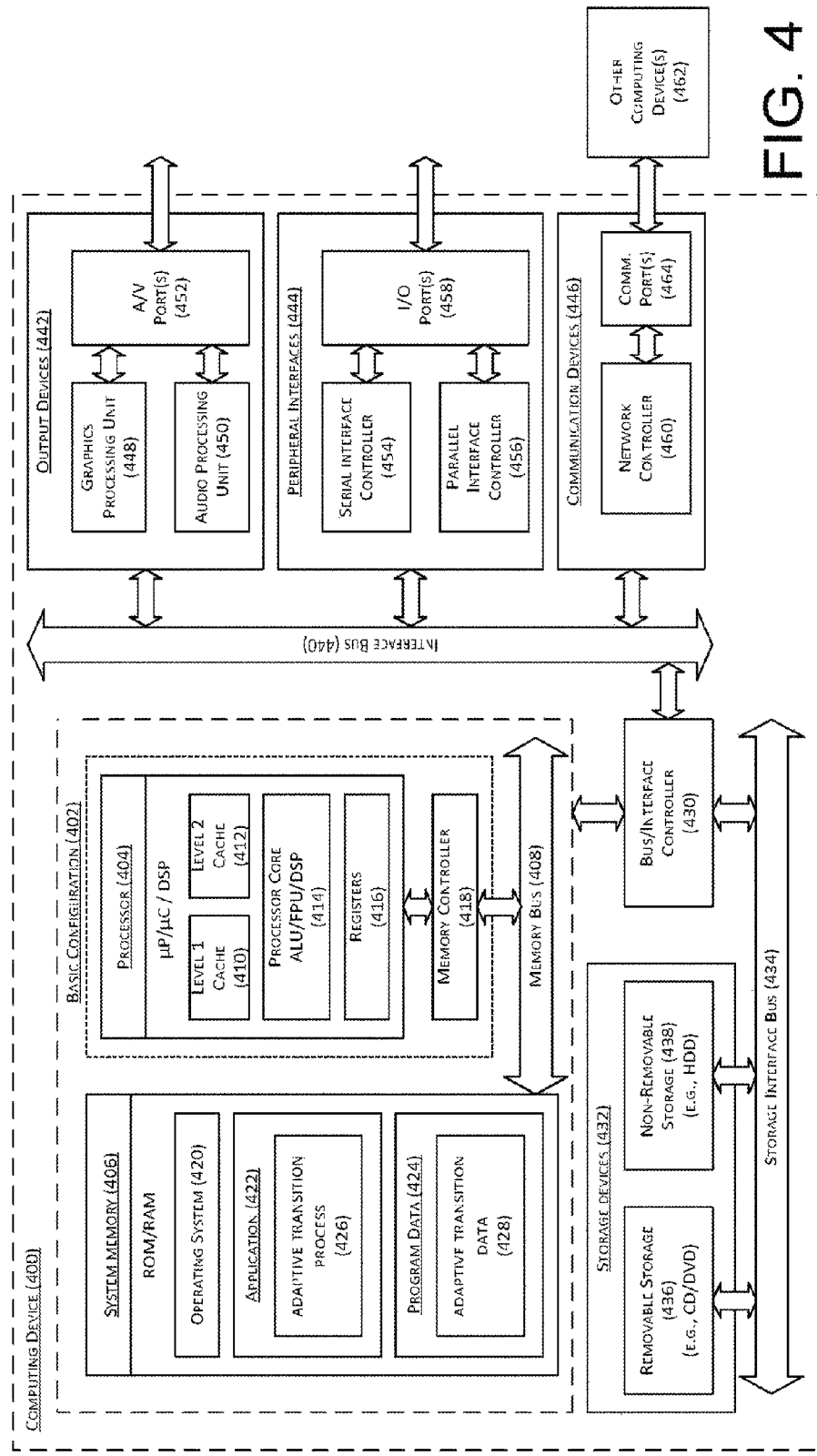

ADAPTIVE TRANSITION OF USER EQUIPMENT

CROSS-REFERENCE TO RELATED APPLICATIONS

This Application is the National Stage filing under 35 U.S.C. §371 of PCT Application Ser. No. PCT/CN13/76900 filed on Jun. 7, 2013. The disclosure of the PCT Application is hereby incorporated herein by reference in its entirety.

TECHNICAL FIELD

The technologies described herein pertain generally to adaptive transition of user equipment that may be communicatively coupled to a base station within a cell of a cellular network.

BACKGROUND

Unless otherwise indicated herein, the approaches described in this section are not prior art to the claims in this application and are not admitted to be prior art by inclusion in this section.

In a wireless communication system, e.g., a cell of a cellular network, a base station may be configured to change, or switch, the communication state of a user equipment between a connected state and an idle state. However, the change process may cost great transmissions and interactions between the user equipment and the cell and, thus, cause waste of communication resources.

SUMMARY

Technologies are generally described for adaptive transition of user equipment. The various techniques may be implemented in various systems, methods, and/or computer-readable mediums.

In some examples, various techniques may be implemented as methods. Some methods may include initializing a first timer and a second timer with respect to a wireless communication device that is in a connected state, wherein the first timer times out after a first duration of time, the second timer times out after a second duration of time, and the second duration of time is longer than the first duration of time; receiving one or more data packets from the wireless communication device; starting the first timer and the second timer simultaneously; and changing a state of the wireless communication device from the connected state to an idle state when a signal strength between the wireless communication device and a base station is less than a predefined signal strength threshold.

Some other methods may include simultaneously starting a first timer and a second timer with respect to a wireless communication device, wherein the first timer times out after a first duration of time, the second timer times out after a second duration of time, and the second duration of time is longer than the first duration of time; receiving one or more data packets associated with the wireless communication device; determining that the wireless communication device is in a first type of communication state when the receiving occurs before the first timer times out; and determining that the wireless communication device is in a second type of communication state different from the first type of communication state when the receiving occurs after the first timer times out.

In some other examples, various techniques may be implemented as executable instructions stored on one or more computer-readable mediums that, when executed, cause one or more processors to execute various operations. Some computer-readable mediums may store executable instructions that may cause the one or more processors to executing operations including simultaneously starting a first timer and a second timer with respect to a wireless communication device that is in a connected state, wherein the first timer times out after a first duration of time, the second timer times out after a second duration of time, and the second duration of time is longer than the first duration of time; changing a state of the wireless communication device from the connected state to an idle state when a signal strength between the wireless communication device and a base station is less than a predefined signal strength threshold.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

In the detailed description that follows, embodiments are described as illustrations only since various changes and modifications will become apparent to those skilled in the art from the following detailed description. The use of the same reference numbers in different figures indicates similar or identical items. In the drawings:

FIG. 4 shows a block diagram illustrating an example computing device that is arranged for adaptive transition of user equipment, arranged in accordance with at least some embodiments described herein.

DETAILED DESCRIPTION

Figure 1:
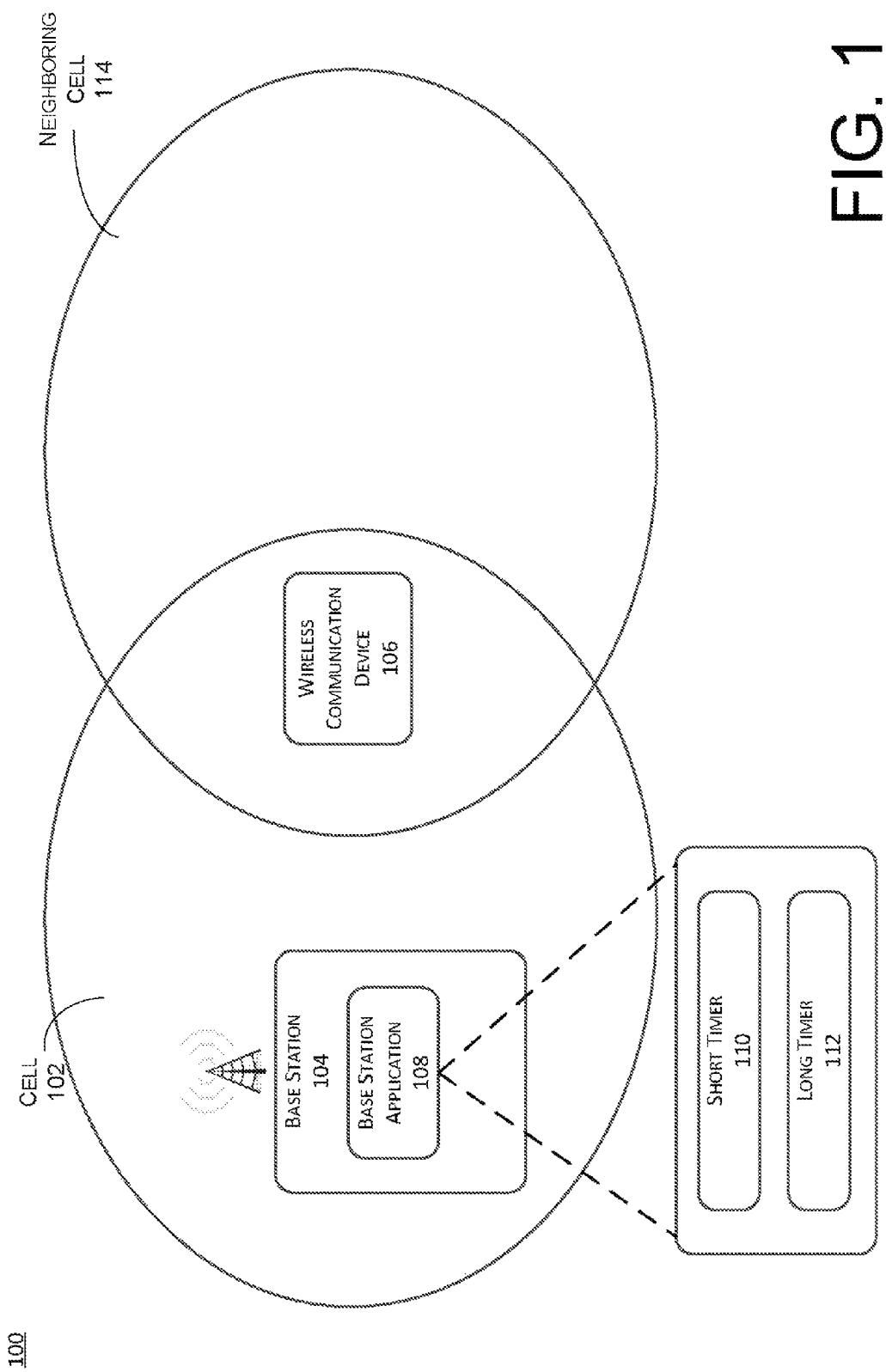
FIG. 1 shows an example system in which adaptive transition of user equipment may be implemented, arranged in accordance with at least some embodiments described herein.

In the following detailed description, references are made to the accompanying drawings, which form a part of the description. In the drawings, similar symbols typically identify similar components, unless context dictates otherwise. Furthermore, unless otherwise noted, the description of each successive drawing may reference features from one or more of the previous drawings to provide clearer context and a more substantive explanation of the current embodiment. Still, the embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein and illustrated in the drawings, may be arranged, substituted, combined, separated, and designed in a wide variety of different configurations, all of which are explicitly contemplated herein.

FIG. 1 shows an example system 100 in which adaptive transition of user equipment may be implemented, arranged in accordance with at least some embodiments described herein. As depicted, example system 100 may include, at least, a cell 102; a base station 104 that provides communication services for wireless communication devices within cell 102; wireless communication device 106 that is located within cell 102; application 108 that is hosted by base station 104; and a short timer 110 and a long timer 112, which are implemented by application 108. Wireless communication device 106 may be located in an overlapped coverage of cell 102 and a neighboring cell 114.

Cell 102 may refer to a range of radio coverage in a respective cellular network. Cell 102 may be configured to provide wireless communication for user equipment therein, e.g., wireless communication device 106, and may further be equipped with base station 104. The range may be measured in terms of distance from an antenna corresponding to base station 104, by which the distance in a given direction may depend upon a variety of performance parameters, e.g., electric current powering the antenna, antenna height, topography in a given direction, etc. Cell 102 may be overlapped with neighboring cell 114.

Base station 104 may refer to a combination of physical devices and hardware components that may be configured to host one or more software programs, e.g., base station application 108, to support wireless communication between one or more embodiments of wireless communication device 106 within cell 102. That is, base station 104 may be configured to transmit wireless signals to and receive wireless signals from the one or more embodiments of wireless communication device 106 within cell 102. Such communication may be implemented in accordance with different wireless communication standards including Time Division Duplex Long Term Evolution (TDD-LTE), Frequency Division Duplexing (FDD-LTE), IEEE 802.15.4, Global System for Mobile Communications (GSM), General packet radio service (GPRS), Code Division Multiple Access (CDMA), 3rd generation of mobile telecommunications technology (3G), etc., which may further determine a work mode of the respective embodiments of wireless communication device 106 within cell 102. The work modes may include TDD mode and FDD mode. Such examples are not intended to be limiting, and therefore should not be interpreted to be so.

Wireless communication device 106 may refer to a mobile (or portable) electronic device such as a mobile phone, smartphone, personal digital assistant (PDA) a personal media player device, an application specific device, or a hybrid device that includes any of the above functions. Alternatively, wireless communication device 106 may be implemented as a personal computer including tablet, laptop computer, non-laptop computer configure configurations, etc. In an LTE system, wireless communication device 106 may be set in an idle state or a connected state by base station application 108.

As referenced herein, "an idle state" may refer to a state in which wireless communication device 106 may not transmit and to receive one or more data packets from base station 104.

As referenced herein, "a connected state" may refer wireless communication device 106 may be permitted to transmit and to receive one or more data packets from base station 104. The connected state may include a Radio Resource Control (RRC) Connected state in accordance with LTE standard.

Base station application 108 may refer to a software program or otherwise executed on base station 104 that may be configured to control physical devices and hardware components of base station 104. In accordance with some examples, base station application 108 may be configured to change, or switch, the state of wireless communication device 106 between the idle state and the connected state according to short timer 110 and long timer 112.

Short timer 110 and long timer 112 may each refer to a software program, a hardware component, a firmware, or a combination thereof that may be configured to count down from a time duration predetermined by base station application 108. In accordance with an example execution of base station application 108, duration of time set for long timer 112 may be longer than the duration of time set for short timer 110.

In accordance with some examples, base station application 108 may be configured to initiate and start short timer 110 and long timer 112 when wireless communication device 106 completes transmission of a data packet, i.e., when wireless communication device 106 is in the connected state. Further, base station application 108 may be configured to restart short timer 110 and long timer 112 when wireless communication device 106 requests to transmit one or more data packets or when other embodiments of wireless communication device 106 transmits one or more requests to, e.g., base station 104, to transmit one or more data packets to wireless communication device 106. As depicted in FIG. 1, wireless communication device 106 may be located in an area in which cell 102 and neighboring cell 114 overlap. Thus, when the strength of the wireless signals transmitted from base station 104 to wireless communication device 106 falls below a predetermined threshold level or when the strength of the wireless signals transmitted from base station 104 to wireless communication device 106 is lower than the signal strength from neighboring base station 104 by a predefined offset wireless communication device 106 may submit a request to base station 104 to start communication with other wireless communication devices via neighboring cell 114. An example of such request may include Event A3, in accordance with an LTE system. Base station application 108 may change wireless communication device 106 to the idle state and to stop short timer 110 and long timer 112 if base station 104 receives the request before long timer 112 times out. On the contrary, base station application 108 may be configured to maintain short timer 110, long timer 112, and the connected state of wireless communication device 106 to avoid additional waste of wireless communication resources if base station 104 receives the request after long timer 112 times out.

Thus, FIG. 1 shows an example system 100 that may include cell 102 supported by base station 104 that hosts base station application 108, which may include short timer 110 and long timer 112.

Figure 2:
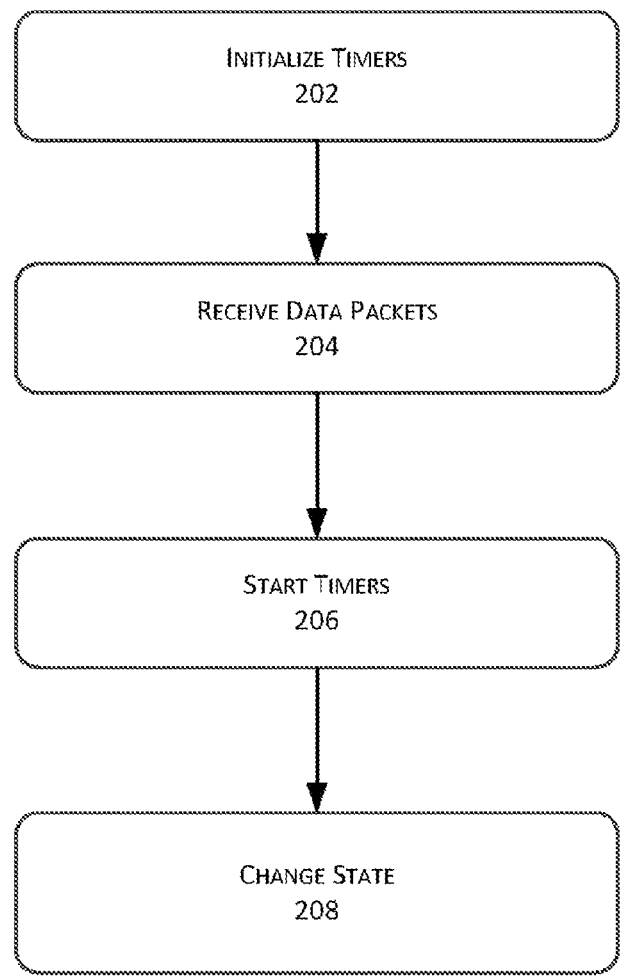
FIG. 2 shows an example configuration of a processing flow of operations by which adaptive transition of user equipment may be implemented, arranged in accordance with at least some embodiments described herein.

FIG. 2 shows an example configuration of a processing flow 200 of operations by which adaptive transition of user equipment may be implemented, arranged in accordance with at least some embodiments described herein. As depicted, processing flow 200 may include sub-processes executed by various components that are part of example system 100. However, processing flow 200 is not limited to such components, and modification may be made by re-ordering two or more of the sub-processes described here, eliminating at least one of the sub-processes, adding further sub-processes, substituting components, or even having various components assuming sub-processing roles accorded to other components in the following description. Processing flow 200 may include various operations, functions, or actions as illustrated by one or more of blocks 202, 204, 206, and 208. Processing may begin at block 202.

Block 202 (Initialize Timers) may refer to base station application 108 initializing a first timer, e.g., short timer 110, and a second timer, e.g., long timer 112, with respect to wireless communication device 106 that is in a connected state, relative to base station 104. The connected state may include a Radio Resource Control (RRC) Connected state in accordance with LTE standard. The time duration initialized for long timer 112 may be longer than the time duration of short timer 110. In accordance with some examples, the time duration of short timer 110 may be set to be greater than a predefined interval of delay between two consecutive data packets, e.g., Packet Delay Budget (PDB) in accordance with standardized Quality of Service (QoS) Class Identifier. In some other examples, the interval of delay between two consecutive data packets may be predefined based on statistical data, e.g., average delay between data packets during transmission. Processing may continue from block 202 to block 204.

Block 204 (Receive Data Packets) may refer to base station 104 receiving one or more data packets transmitted by wireless communication device 106. Wireless communication device 106 may be in a connected state to transmit or receive data packets, relative to base station 104. When wireless communication device 106 is in an idle state, base station application 108 may change the state of wireless communication device 106 to the connected state before base station 104 transmits data packets to wireless communication device 106. Processing may continue from block 204 to block 206.

Block 206 (Start Timers) may refer to base station application 108 simultaneously starting short timer 110 and long timer 112 upon the one or more data packets being received at base station 104. Short timer 110 and long timer 112 may be configured to count down from the respective initialized durations of time. Processing may continue from block 206 to block 208.

Block 208 (Change state) may refer to base station application 108 changing the state of wireless communication device 106 to an idle state when a signal strength between the wireless communication device and base station 104 is less than a predefined signal strength threshold. In accordance with some examples, wireless communication device 106 may be configured to monitor the signal strength of the wireless signals transmitted from base station 104 by monitoring the electricity current through an antenna of wireless communication device 106. When the signal strength falls below the predefined signal strength threshold, base station 104 may receive a message indicative of the poor signal strength from wireless communication device 106. The indication may include a report from wireless communication device 106, which indicates that a signal strength of neighboring cell 114 is stronger than the monitored signal strength in cell 102.

Thus, FIG. 2 shows an example configuration of a processing flow 200 of operations that may include initializing short timer 110 and long timer 112 with respect to wireless communication device 106, receiving one or more data packets from wireless communication device 106, starting short timer and long timer simultaneously in response to the receiving, and changing a state of wireless communication device 106 from the connected state to an idle state when a signal strength between wireless communication device 106 and base station 104 is less than a predefined signal strength threshold.

Figure 3:
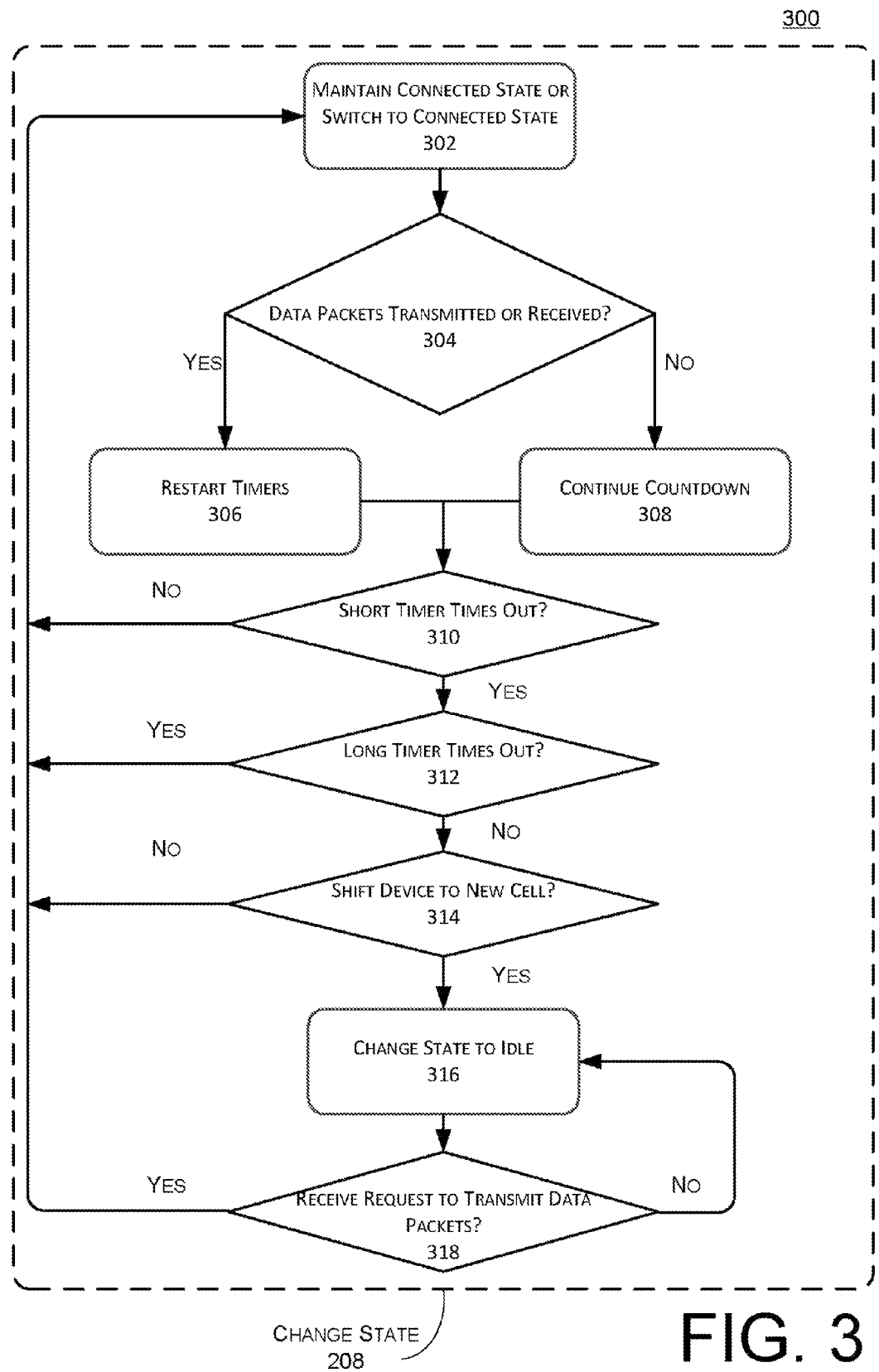
FIG. 3 shows an example configuration of a sub-processing flow of operations by which adaptive transition of user equipment may be implemented, arranged in accordance with at least some embodiments described herein.

FIG. 3 shows an example configuration of a sub-processing flow 300 of operations by which adaptive transition of user equipment may be implemented, arranged in accordance with at least some embodiments described herein. As depicted, sub-processing flow 300 may include sub-processes executed by various components that are part of example system 100. However, sub-processing flow 300 is not limited to such components, and modification may be made by re-ordering two or more of the sub-processes described here, eliminating at least one of the sub-processes, adding further sub-processes, substituting components, or even having various components assuming sub-processing roles accorded to other components in the following description. Sub-processing flow 300 may include various operations, functions, or actions as illustrated by one or more of blocks 302, 304, 306, 308, 310, 312, 314, 316, and 318. Processing may begin at block 302.

Block 302 (Maintain Connected State or Switch to Connected State) may refer to base station application 108 maintaining the state of wireless communication device 106 as connected or switch the state of wireless communication device 106 from idle state to connected state. Processing may continue from block 302 to block 304.

Decision block 304 (Data Packets Transmitted or Received?) may refer to base station application 108 determining whether wireless communication device 106 is transmitting or receiving one or more data packets after short timer 110 and long timer 112 are started by base station application 108. If "yes," processing may continue from decision block 304 to block 306. If "no," processing may continue from decision block 304 to block 308.

Block 306 (Restart Timers) may refer to base station application 108 restarting short timer 110 and long timer 112 simultaneously when wireless communication device 106 has been determined to be transmitting or receiving one or more data packets after short timer 110 and long timer 112 were started. Processing may continue from block 306 to decision block 310.

Block 308 (Continue Countdown) may refer to base station application 108 continuing the countdowns by short timer 110 and long timer 112, respectively, if wireless communication device 106 has not been determined to be transmitting or receiving one or more data packets after short timer 110 and long timer 112 were started. Processing may continue from block 308 to decision block 310.

Decision block 310 (Short Timer Times Out?) may refer to base station application 108 determining whether short timer 110 times out prior to base station application 108 receiving a request to transmit data packets from wireless communication device 106. If "yes," processing may continue from decision block 310 to decision block 312. If "no," processing may revert from decision block 310 to block 302.

Decision block 312 (Long Timer Times Out?) may refer to base station application 108 determining whether long timer 112 times out prior to base station application 108 receiving the request to start communication with other wireless communication devices via neighboring cell 114. If "no," processing may continue from decision block 312 to decision block 314. If "yes," processing may revert from decision block 310 to block 302.

Decision block 314 (Shift Device to New Cell?) may refer to base station application 108 determining whether base station 104 has received, from wireless communication device 106, an indication or notification that wireless communication device 106 will start wireless communication via a base station corresponding to neighboring cell 114, instead of base station 104 corresponding to cell 102. In some examples, when wireless communication device 106 is located in an area in which cell 102 and neighboring cell 114 overlap, the wireless signal strength of the wireless signals transmitted from base station 104 to wireless communication device 106 may fall below a predetermined threshold level, resulting in deteriorated communication quality. In order to avoid the deteriorated communication quality due to the weak wireless signals transmitted from base station 104, wireless communication device 106 may then start to communicate with other wireless communication devices via neighboring cell 114 and simultaneously notify base station 104 of the new communication via neighboring cell 114. If "yes," processing may continue from decision block 314 to block 316. If "no," processing may revert to from decision block 314 to block 302.

Block 316 (Change State to Idle) may refer to base station application 108 changing the state of wireless communication device 106 to an idle state. Alternatively, base station application 108 may be configured to maintain the state of wireless communication device 106 as an idle state. When wireless communication device 106 is set in an idle state, base station 104 may not receive or transmit data packets from or to wireless communication device 106 unless wireless communication 106 submits a request to base station 104 and base station application 108 changes the state to a connected state. Processing may continue from block 316 to decision block 318.

Decision block 318 (Receive Request to Transmit Data Packets?) may refer to base station application 108 determining whether base station 104 has received one or more requests, submitted by wireless communication device 106, to transmit one or more data packets from wireless communication device 106. If "yes," processing may revert to block 302. If "no," processing may revert to block 316.

Thus, FIG. 3 shows an example configuration of a sub-processing flow 300 of operations that may be included in block 208 of processing flow 200.

FIG. 4 is a block diagram illustrating an example computing device 400 that is arranged for adaptive transition of user equipment in accordance with the present disclosure. In a very basic configuration 402, computing device 400 typically includes one or more processors 404 and a system memory 406. A memory bus 408 may be used for communicating between processor 404 and system memory 406.

Depending on the desired configuration, processor 404 may be of any type including but not limited to a microprocessor (μP), a microcontroller (μC), a digital signal processor (DSP), or any combination thereof. Processor 404 may include one more levels of caching, such as a level one cache 410 and a level two cache 412, a processor core 414, and registers 416. An example processor core 414 may include an arithmetic logic unit (ALU), a floating point unit (FPU), a digital signal processing core (DSP Core), or any combination thereof. An example memory controller 418 may also be used with processor 404, or in some implementations memory controller 418 may be an internal part of processor 404.

Depending on the desired configuration, system memory 406 may be of any type including but not limited to volatile memory (such as RAM), non-volatile memory (such as ROM, flash memory, etc.) or any combination thereof. System memory 406 may include an operating system 420, one or more applications 422, and program data 424. Application 422 may include an adaptive transition process 426 that is arranged to perform the functions as described herein including those described with respect to process 200 of FIG. 2 and process 300 of FIG. 3. Program data 424 may include adaptive transition data 428 that may be useful for adaptive transition process 426 as is described herein. In some embodiments, application 422 may be arranged to operate with program data 424 on operating system 420 such that implementations of robust adaptive transition of user equipment may be provided as described herein. This described basic configuration 402 is illustrated in FIG. 4 by those components within the inner dashed line.

Computing device 400 may have additional features or functionality, and additional interfaces to facilitate communications between basic configuration 402 and any required devices and interfaces. For example, a bus/interface controller 430 may be used to facilitate communications between basic configuration 402 and one or more data storage devices 432 via a storage interface bus 434. Data storage devices 432 may be removable storage devices 436, non-removable storage devices 438, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media may include volatile and nonvolatile, removable and non-removable media implemented in any method or technology for storage of information, such as computer readable instructions, data structures, program modules, or other data.

System memory 406, removable storage devices 436 and non-removable storage devices 438 are examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by computing device 400. Any such computer storage media may be part of computing device 400.

Computing device 400 may also include an interface bus 440 for facilitating communication from various interface devices (e.g., output devices 442, peripheral interfaces 444, and communication devices 446) to basic configuration 402 via bus/interface controller 430. Example output devices 442 include a graphics processing unit 448 and an audio processing unit 450, which may be configured to communicate to various external devices such as a display or speakers via one or more A/V ports 452. Example peripheral interfaces 444 include a serial interface controller 454 or a parallel interface controller 456, which may be configured to communicate with external devices such as input devices (e.g., keyboard, mouse, pen, voice input device, touch input device, etc.) or other peripheral devices (e.g., printer, scanner, etc.) via one or more I/O ports 458. An example communication device 446 includes a network controller 460, which may be arranged to facilitate communications with one or more other computing devices 462 over a network communication link via one or more communication ports 464.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

Computing device 400 may be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. Computing device 400 may also be implemented as a personal computer including both laptop computer and non-laptop computer configurations.

I claim:

1. A method, comprising:
   initializing a first timer and a second timer with respect to a wireless communication device that is in a connected state, wherein:
   the first timer times out after a first duration of time,
   the second timer times out after a second duration of time, and
   the second duration of time is longer than the first duration of time;
   receiving one or more data packets from the wireless communication device;
   starting the first timer and the second timer simultaneously; and
   changing a state of the wireless communication device from the connected state to an idle state when a signal strength between the wireless communication device and a base station becomes less than a predefined signal strength threshold when the first timer times out and the second timer has not timed out.

2. The method of claim 1, wherein the connected state is a Radio Resource Control (RRC)-Connected state in accordance with the Long Term Evolution (LTE) standard.

3. The method of claim 1, wherein the first duration of time is greater than a predefined interval of delay between consecutive data packets.

4. The method of claim 1, further comprising:
   receiving an indication that the signal strength between the wireless communication device and the base station is less than the predefined signal strength threshold.

5. The method of claim 4, wherein the receiving an indication comprises receiving a report from the wireless communication device indicating that a signal strength of a neighboring cell is stronger than a signal strength of a serving cell that the wireless communication device is in by a predefined offset.

6. The method of claim 1, further comprising:
   terminating the first timer and the second timer when changing the state of the wireless communication device to the idle state.

7. The method of claim 1, further comprising:
   receiving one or more additional data packets from the wireless communication device; and
   reverting the state of the wireless communication device to the connected state in response to the receiving the one or more additional data packets from the wireless communication device.

8. The method of claim 1, further comprising:
   maintaining the state of the wireless communication device in the connected state when:
   no data packets have been received from the wireless communication device before the second timer times out, and
   the signal strength between the wireless communication device and the base station is greater than or equal to the predefined signal strength threshold.

9. A method, comprising:
   simultaneously starting a first timer and a second timer with respect to a wireless communication device when the wireless communication device receives or transmits a first data packet in a first type of communication state, wherein:
   the first timer times out after a first duration of time,
   the second timer times out after a second duration of time from the starting, and
   the second duration of time is longer than the first duration of time;
   receiving one or more second data packets associated with the wireless communication device;
   maintaining the wireless communication device in the first type of communication state when the receiving occurs before the first timer times out; and
   changing the wireless communication device to a second type of communication state different from the first type of communication state in response to an event that indicates the wireless communication device is switching between two cells after the first timer times out.

10. The method of claim 9, wherein the first duration of time is greater than a predefined interval of delay between consecutive second data packets.

11. The method of claim 9, wherein the wireless communication device receives or transmits data packets other than background information when in the first type of communication state, and wherein the wireless communication device transmits background information and no data packets when in the second type of communication state.

12. The method of claim 9, wherein the changing comprises receiving an indication that a signal strength between the wireless communication device and a base station is less than a predefined signal strength threshold.

13. The method of claim 12, wherein the receiving an indication comprises receiving a report from the wireless communication device indicating that a signal strength of a neighboring cell is better than a signal strength of a serving cell that the wireless communication device is in by a predefined offset.

14. The method of claim 12, further comprising:
   setting a state of the wireless communication device to an idle state in response to:
   the first timer having timed out,
   the second timer having not timed out, and
   the receiving of the indication.

15. The method of claim 14, further comprising:
   terminating the first timer and the second timer.

16. The method of claim 14, further comprising:
   setting the state of the wireless communication device to a connected state when receiving one or more additional data packets from the wireless communication device.

17. A non-transitory computer-readable medium storing instructions that, when executed, cause one or more processors to perform operations comprising:
   simultaneously starting a first timer and a second timer with respect to a wireless communication device that is in a connected state, wherein:
   the first timer times out after a first duration of time,
   the second timer times out after a second duration of time, and
   the second duration of time is longer than the first duration of time; and
   changing a state of the wireless communication device from the connected state to an idle state when:
   no data packets have been received from the wireless communication device after the first timer times out and before the second timer times out, and a signal strength between the wireless communication device and a base station is less than a predefined signal strength threshold.

18. The computer-readable medium of claim 17, wherein the connected state is a Radio Resource Control (RRC)-Connected state in accordance with the Long Term Evolution (LTE) standard.

19. The computer-readable medium of claim 17, wherein the first duration of time is greater than a predefined interval of delay between consecutive data packets.

20. The computer-readable medium of claim 17, wherein the operations further comprise:
receiving an indication that the signal strength between the wireless communication device and the base station is less than the predefined signal strength threshold.

21. The computer-readable medium of claim 20, wherein the receiving and indication comprises receiving an Event A3 report from the wireless communication device in accordance with the LTE standard.

22. The computer-readable medium of claim 17, wherein the operations further comprise:
terminating the first timer and the second timer when changing the state of the wireless communication device to the idle state.

23. The computer-readable medium of claim 17, wherein the operations further comprise:
receiving one or more additional data packets from the wireless communication device; and
reverting the state of the wireless communication device to the connected state in response to the receiving the one or more additional data packets from the wireless communication device.

24. The computer-readable medium of claim 17, wherein the operations further comprise:
maintaining the state of the wireless communication device in the connected state when:
no data packets have been received from the wireless communication device before the second timer times out, and
the signal strength between the wireless communication device and the base station is greater than or equal to the predefined signal strength threshold.

\* \* \* \* \*